United States Patent
Yoshitake et al.

(10) Patent No.: US 7,209,341 B2
(45) Date of Patent: Apr. 24, 2007

(54) POLARIZING ELECTRODE, MANUFACTURING METHOD THEREOF, AND ELECTRIC DOUBLE-LAYER CAPACITOR

(75) Inventors: Tsutomu Yoshitake, Tokyo (JP); Sumio Iijima, Nagoya (JP); Masako Yudasaka, Tsukuba (JP)

(73) Assignees: Japan Science and Technology Agency, Saitama (JP); NEC Corporation, Tokyo (JP)

( * ) Notice: Subject to any disclaimer, the term of this patent is extended or adjusted under 35 U.S.C. 154(b) by 166 days.

(21) Appl. No.: 10/815,120

(22) Filed: Mar. 26, 2004

(65) Prior Publication Data
US 2004/0252442 A1 Dec. 16, 2004

Related U.S. Application Data

(63) Continuation of application No. PCT/JP02/09953, filed on Sep. 26, 2002.

(30) Foreign Application Priority Data

Sep. 26, 2001 (JP) .............................. 2001/294769

(51) Int. Cl.
*H01G 9/00* (2006.01)
(52) U.S. Cl. .................. 361/502; 361/503; 423/445 R
(58) Field of Classification Search ................ 361/502, 361/503; 423/445 R
See application file for complete search history.

(56) References Cited

FOREIGN PATENT DOCUMENTS

| JP | 03-093213 | 4/1991 |
|---|---|---|
| JP | 4-44407 | 7/1992 |
| JP | 4-288361 | 10/1992 |
| JP | 7-201677 | 8/1995 |
| JP | 10-097956 | 4/1998 |
| JP | 11-126734 | 5/1999 |
| JP | 11-260669 | 9/1999 |
| JP | 2000-510999 | 8/2000 |
| JP | 2001-64004 | 3/2001 |
| JP | 2002-159851 | 6/2002 |

OTHER PUBLICATIONS

Japanese Office Action dated Aug. 25, 2004 with translation.
Japanese Office Action dated Oct. 15, 2003 with translation.

*Primary Examiner*—Eric W. Thomas
(74) *Attorney, Agent, or Firm*—Katten Muchin Rosenman LLP

(57) ABSTRACT

An electric double-layer capacitor includes a carbon composite electrode which serves as a polarizing electrode and made of a single-layer carbon nanohorn aggregate having a specific structure and a very large surface area. The single carbon nanohorn aggregate is mixed with a phenol resin, the mixture is formed and heated to produce a carbon composite electrode. The carbon composite electrode is impregnated with an electrolyte to become a polarizing electrode. An electric double-layer capacitor includes this polarizing electrode has a large capacitance and is capable of discharging with large current.

11 Claims, 2 Drawing Sheets

POLARIZING ELECTRODE, MANUFACTURING METHOD THEREOF, AND ELECTRIC DOUBLE-LAYER CAPACITOR

CROSS-REFERENCE TO RELATED APPLICATION

The present application is a continuation of and claims priority uinder 35 USC § 120 from International PCT Application No. PCT/JP02/09953, filed on Sep. 26, 2002 which claims priority under 35 USC § 119 from Japanese Patent Application Number 294769/2001 filed on Sep. 26, 2001.

TECHNICAL FIELD

The present invention relates to an electric double-layer capacitor and, more particularly, the present invention relates to a polarizing electrode to be used therefor.

BACKGROUND ART

The electric double-layer capacitor uses a pair of electric charge layers (electric double-layer capacitor) each of which having different codes and which is generated on a boundary between a conductive material composing an electrode and an electrolyte impregnated in the conductive material; and the electric double-layer capacitor is characterized by not causing deterioration which occurs as a result of charge and discharge. Therefore, for example, the electric double-layer capacitor is used in such a manner that it is connected to a power supply (a battery or a power supply converting a commercial AC power supply into a direct current) in parallel to accumulate electric charges and, by discharging the electric charges accumulated in the power supply on a short transmission interruption of the power supply, it backups various electric and electronic devices (for example, a D-RAM or the like).

The existing electric double-layer capacitor uses an active carbon powder or the like as a conductor material for an electrode (a carbon material) because a capacitance of the electric double-layer capacitor is determined by an amount of the electric charges to be accumulated in the electric double-layer capacitor. As a surface area of the electrode becomes larger, the amount of the electric charges becomes larger. The active carbon has a high specific surface area which is not less than 1,000 m$^2$/g so that the active carbon is suitable for the electrode material of the amount of the electric double-layer capacitor requiring a large surface area.

The electric double-layer capacitor using the active carbon power as a polarizing electrode is described, for example, in JP-A-4-44407. The polarizing electrode described in this publication is a solid active carbon electrode which is solidified by mixing the active carbon power with a heat hardening phenol resin such as a phenol resin or the like.

Among the electric double-layer capacitors, the one with a high capacity is expected to be used for a power supply for a pulse power. However, a conventional electric double-layer capacitor cannot supply a large current in an instant so that it cannot carry out a function which is required to serve as a power supply for the pulse power. This is because the movement of ions is inhibited inside of a microscopic fine pore with a diameter of a several nm contained in the active carbon powder. In details, as described in JP-A-4-288361, the solid active carbon electrode using the active carbon power has the fine pore with a diameter of a several nm contained in the active carbon powder, and a pore with a diameter of a 100 nm or more formed upon carbonizing the phenol resin. Among these fine pores, inside of the microscopic fine pore with a diameter of a several nm contained in the active carbon powder, movement of ions is inhibited. As a result, the conventional electric double-layer capacitor involves a problem such that, when a large current is discharged, a capacity is decreased by appearance and the conventional electric double-layer capacitor cannot sufficiently offer a performance. Therefore, it is expected to realize an electrode having a fine pore structure (a distribution of seized of the fine pore) so that the ions can be moved more easily.

In addition, the maximum current value capable of being supplied to an electrode per unit area is proportion to a capacitance per unit area of the electrode. Therefore, it is preferable that the capacitance per unit area of the electrode is large.

In order to solve the above-described problems, an object of the present invention is to provide a polarizing electrode having a fine pore size distribution (a structure of a fine pore) so as to make moving of ions easier and its manufacturing method; and to provide an electric double-layer capacitor using the polarizing electrode, which has a large capacitance and is capable of taking out a large current in a moment of time.

DISCLOSURE OF THE INVENTION

Firstly, the present invention provides a first polarizing electrode composed of a carbon composite, wherein, as a carbon material of the carbon composite, a single-layer carbon nanohorn aggregate, which is made in such a manner that the single-layer carbon nanohorns are aggregated spherically, is used.

Secondly, the present invention provides a second polarizing electrode according to the above-described first polarizing electrode, wherein the single-layer carbon nanohorn is a single-layer graphite nanohorn.

Thirdly, the present invention provides a third polarizing electrode according to the above-described first or second polarizing electrode, wherein the single-layer carbon nanohorn aggregate is supported by a carbon fiber or a carbon nanofiber.

Fourthly, the present invention provides a fourth polarizing electrode according to the above-described third polarizing electrode, wherein, by allowing a front end of the single-layer carbon nanohorn composing the single-layer carbon nanohorn aggregate to be fused to the carbon fiber or the carbon nanofiber, the single-layer carbon nanohorn aggregate is supported by the carbon fiber or the carbon nanofiber.

Fifthly, the present invention provides a first method for manufacturing any one of the above-descried first to fourth polarizing electrodes, comprising a step of: obtaining the carbon composite by molding a mixture of the single-layer carbon nanohorn aggregate and a heat fusible and heat hardening phenol resin at 80–120° C., and carrying out a heat treatment in a no-oxidizing atmosphere.

Sixthly, the present invention provides a second method for manufacturing any one of the above-descried first to fourth polarizing electrodes, comprising a step of: obtaining the carbon composite by molding a mixture of said single-layer carbon nanohorn aggregate, a heat fusible and heat hardening phenol resin, and a heat infusible phenol resin of a weight ratio of 15 to 60% with respect to the heat fusible and heat hardening phenol resin, and carrying out a heat treatment in no-oxidizing atmosphere.

Seventhly, the present invention provides an electric double-layer capacitor comprising any one of the above-described first to fourth polarizing electrodes or the polarizing electrode that is manufactured by the above-described first or second method for manufacturing a polarizing electrode.

BEST MODE FOR EMBODYING THE INVENTION

In order to understand the present invention more clearly, the preferred embodiments according to the present invention will be described in detail with reference to the drawings below.

Generally, since the polarizing electrode can obtain a larger capacitance as the surface area thereof is larger, it is often the case that a material having a large specific surface area of 1,000 $m^2/g$ or more such as an active carbon is used. However, when the active carbon is used for the polarizing electrode, the movement of he ions is inhibited in the inside of the microscopic fine pore with a diameter of a several nm contained in the active carbon, so this involves a problem such that, when a large current is discharged, a capacity is decreased by appearance and the conventional electric double-layer capacitor cannot sufficiently offer a performance. Accordingly, a carbon material used for the polarizing electrode of the electric double-layer capacitor needs both of the large specific surface area in order to make the capacitance larger and the appropriate fine pore size distribution (structure) in order to make the movement of ions higher.

As a material satisfying the above-described conditions, in recent days, the inventors of the present invention invented a single-layer carbon nanohorn aggregate, which is made in such a manner that the single-layer carbon nanohorns as a new carbon isotope made of only carbon atoms are aggregated spherically (Japanese Patent Laid-open Publication, JP-A-2000-159851). In the electric double-layer capacitor according to the present embodiment, as a carbon particle used for its polarizing electrode, this single-layer carbon nanohorn aggregate made in such a manner that the single-layer carbon nanohorns are aggregated spherically is used.

Figure 1:
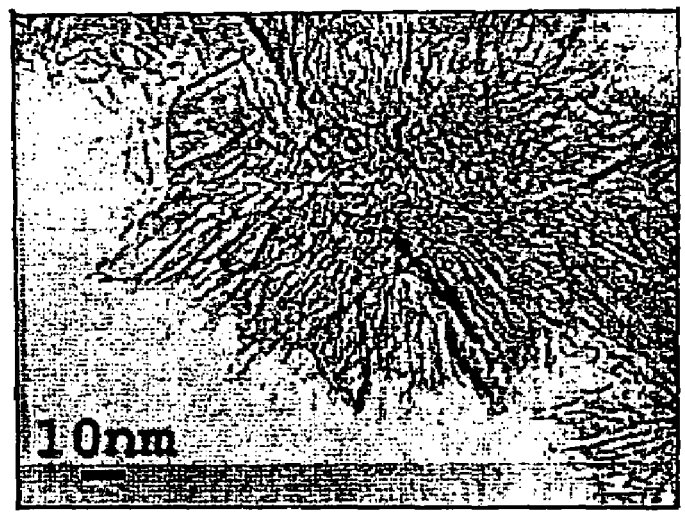
FIG. 1 is an enlarged electron micrograph of a single-layer carbon nanohorn aggregate to be used by the present invention.
Figure 2:
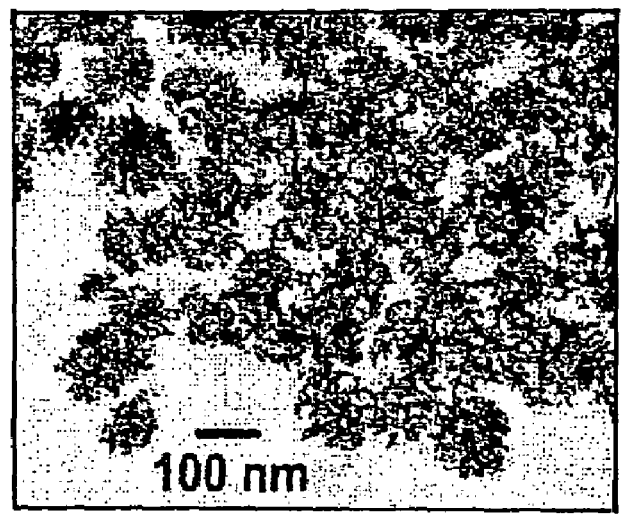
FIG. 2 is an enlarged electron micrograph of a group of single-layer carbon nanohorn aggregates to be used by the present invention.

The single-layer carbon nanohorn is a tubular material with one end of a single-layer carbon nanotube conically shaped. As shown in the electron micrograph of FIG. 1, in the single-layer carbon nanohorn aggregate, many single-layer carbon nanohorns are aggregated by a van der Waals force acting therebetween. In each single-layer carbon nanohorn, its tube part faces to a center part of the aggregate and its conical part projects from a surface of the aggregate as a horn. A diameter of this single-layer carbon nanohorn is 120 nm or less, and typically, it is about 10–100 nm. In addition, each nanotube composing the single-layer carbon nanohorn aggregate has a diameter of about 2 nm and a length of about 30 to 50 nm, and its conical part has an inclination of an axial cross section, of which average degree is about 20 degrees. Then, as shown in FIG. 2, by aggregating many single-layer carbon nanohorn aggregates, minute powders are composed.

The single-layer carbon nanohorn aggregate having the-above described specific structure has a very large surface area. In addition, when this single-layer carbon nanohorn aggregate is used as a carbon particle of the electric double-layer capacitor, the acquired c is made in such a manner that spherical particles of the single-layer carbon nanohorn aggregate are aggregated. Then, between these spherical particles, there are fine pores, of which maximum sizes are about tens nm. In other words, the polarizing electrode using the single-layer carbon nanohorn aggregate has a porous structure with a fine pore of which diameter is larger than that of the active carbon. As a result, mobility of ion is made higher as compared to the case of using the active carbon, so that lowering of the capacity by appearance is hardly caused also when discharging a large current. Thus, by using the single-layer carbon nanohorn aggregate with a specific structure as a carbon particle of its polarizing electrode, the electric double-layer capacitor according to the present invention can increase the specific surface area so as to make the capacitance higher, and further, it can form a fine pore size distribution (a fine pore structure) naturally, whereby the mobility of ions is made higher.

The single-layer carbon nanohorn aggregate to be used for the present embodiment can be manufactured, for example, by a laser ablation method targeting a solid carbon single substance such as graphite or the like in an inactive gas atmosphere of 760 Torr at a room temperature. In addition, it is possible to control a shape of each single carbon nanotube in each single-layer carbon nanohorn aggregate, intervals between the single-layer carbon nanotubes, and a size of the fine pore between the spherical particles of the single-layer carbon nanohorn aggregate by a manufacturing condition due to the laser ablation method, oxidation after manufacturing, and after treatment due to a nitric acid or the like. In addition, by heat treatment or the like, it is also possible to make each single-layer carbon nanohorn of this single-layer carbon nanohorn aggregate into a single-layer graphite nanohorn. In this case, an electrical conduction property of the single-layer carbon nanohorn aggregate is improved, so that it is possible to further improve a capability of the polarizing electrode. Further, allowing the above-described single-layer carbon nanohorn aggregate to be supported by a carbon fiber or a carbon nanofiber or the like, a fine pore structure (fine pore size distribution) of the polarizing electrode can be adjusted. As a supporting method in this case, there is a method to fuse a front end of the single-layer carbon nanohorn to the carbon fiber or the carbon nanofiber by the heat treatment in a vacuum atmosphere or the like.

In order to use the single-layer carbon nanohorn aggregate as the polarizing electrode, it is necessary to manufacture a carbon composite (a single-layer carbon nanohorn aggregate/phenol resin composite).

The carbon composite can be obtained, for example, by mixing the single-layer carbon nanohorn aggregate with a heat fusible and heat hardening phenol resin, molding this mixture at 80–120° C., and further, performing the heat treatment in a no-oxidizing atmosphere. In the carbon composite which is obtained in this way, a gap is formed between the single-layer carbon nanohorn aggregate and the phenol resin, and this makes the mobility of ions higher due to the action of this gap. In addition, this single-layer carbon nanohorn aggregate/phenol resin composite has a high specific surface area and a high density, so that the capacitance per unit cubic measure also becomes large and a larger current can be discharged.

In addition, the other carbon composite can be obtained, for example, by mixing the single-layer carbon nanohorn aggregate with the heat fusible and heat hardening phenol resin and a heat infusible phenol resin, molding them, and adding a heat treatment to them. According to this carbon composite, upon molding, the heat infusible phenol rein keeps a particle shape and this results in forming a gap inside of a molded body by carbonizing the heat infusible phenol resin due to the heat treatment after that. Depending on the action of this gap, the mobility of ions is made more improved.

The carbon composite obtained in this way is impregnated with an electrolyte to become a polarizing electrode.

Figure 3:
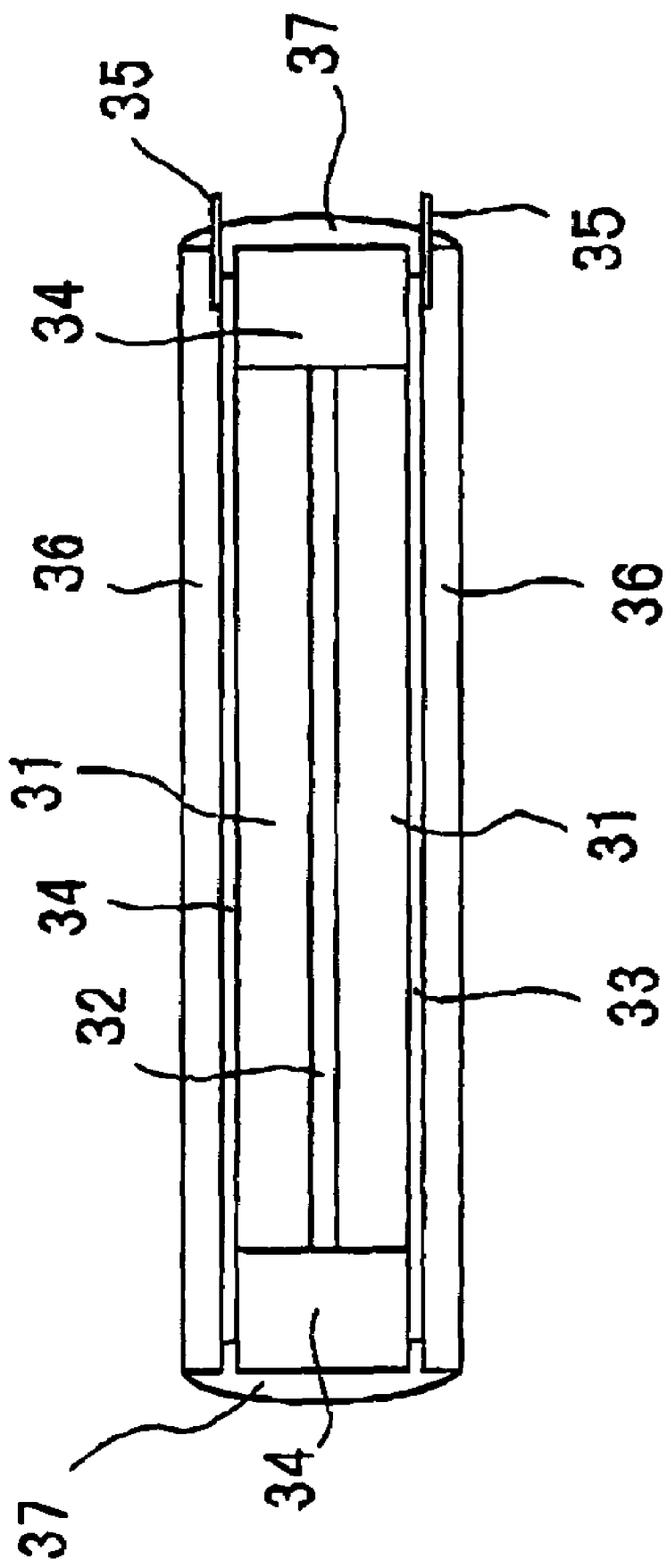
FIG. 3 is a schematic cross sectional view of an electric double-layer capacitor according to a preferred embodiment of the present invention.

The electric double-layer capacitor according to the present embodiment has a pair of polarizing electrodes, which is obtained as described above. In other words, this electric double-layer capacitor, as shown in FIG. 3, has a pair of polarizing electrodes 31, an insulated separator 32 which is fit between the pair of polarizing electrodes and has an ion permeability, a pair of conductive sheets (collector) 33 which is disposed at an end surface of each polarizing electrode 31 so as to sandwich these from the opposite sides (upper and lower in the drawing), a gasket (chassis) 34 made in a frame shape which is arranged surrounding an outer circumference of the polarizing electrode 31 and the separator 32 so as to prevent edge parts of these collectors 33 from contacting each other, an outer terminal 35 which is attached to each conductive sheet 33 by pressure, a supporting body 36 which is arranged at the opposite sides (upper and lower in the drawing) of the collector 33, and an epoxy resin 37 coating the outer circumferential surfaces of the gasket 34 and the supporting body 36 so as to fill the gap between these in order to seal the electrolyte.

The electric double-layer capacitor using the single-layer carbon nanohorn aggregate/phenol resin composite as the polarizing electrode has a large capacitance due to the specific structure of the single-layer carbon nanohorn aggregate and it can easily move ions, so that a large current discharge is possible by this electric double-layer capacitor.

(Embodiments)

Hereinafter, the embodiments of a polarizing electrode according to the present invention, a manufacturing method thereof, and an electric double-layer capacitor using it will be described.

EXAMPLE 1

At first, a single-layer carbon nanohorn aggregate was manufactured by a laser ablation method targeting graphite in an inactive gas atmosphere of 760 Torr at a room temperature, and then, the manufactured carbon nanohorn aggregate was treated with a nitricacid solution. Consequently, mixing the single-layer carbon nanohorn aggregate treated with the nitricacid solution with a heat fusible and heat hardening phenol resin powder (a bellpearl S-type, made by Kanebo Corporation) at a weight ratio of 7:3, further, a dry blending was carried out by a ball mill. In the meantime, the single-layer carbon nanohorn aggregate used here is a single-layer carbon nanohorn aggregate composed of single-layer carbon nanohorns. Then, a specific surface area of this single-layer carbon nanohorn aggregate was 1,300 $m^2/g$.

Dividing the mixture powders made as described above into 10 g each, and molding them at 150° C., at a pressure of 100 $kg/cm^2$, for ten minutes, a plurality of single-layer carbon nanohorn aggregates/phenol resin composites of 70×50 $mm^2$ with a thickness of 3 mm was manufactured. Then, locating these composites in an electric furnace, and a heat treatment of these was performed at 900° C. for two hours. A cubic capacity of a fine pore of the obtained single-layer carbon nanohorn aggregate/phenol resin composite was measured by a mercury injection method, a diameter distribution of the fine pore was acquired, and then, it was found that a peak of the distribution was in a range of 50 to 100 nm.

In addition, for comparison, a plurality of phenol carbon nanohorn aggregates/phenol resin composites using the phenol active carbon powder (a specific surface area 2,000 $m^2/g$) in replace of the single-layer carbon nanohorn aggregate was also manufactured. Sizes of these phenol carbon nanohorn aggregates/phenol resin composites were made identical with the above-described sizes.

In the next place, by using the single-layer carbon nanohorn aggregate/phenol resin composite and the phenol carbon nanohorn aggregate/phenol resin composite, which were manufactured as described above, as the polarizing electrode, respectively, an electric double-layer capacitor was manufactured. A manufacturing method of the electric double-layer capacitor is as follows.

At first, soaking each composite in a nitricacid solution of 30 wt % to be used as an electrolyte of the electric double-layer capacitor, each composite was impregnated with the electrolyte in a vacuum. By this process, each composite became a polarizing electrode.

In the next place, taking out each polarizing electrode from a water solution, and combining the polarizing electrodes made of the same materials into a pair, a separator made of polypropylene was put between the polarizing electrodes so as to make them opposed. Further, at end surfaces of the both sides of the opposed polarizing electrode (rear surface sides of the opposed surfaces), a conductive sheets made of a Bull-rubber as a collector were attached by pressure.

In the next place, a gasket made of polycarbonate was arranged around the polarizing electrode and the separator in order to prevent the edge parts of the collectors at the opposite sides from contacting each other. Then, a pair of support bodies made of polycarbonate was disposed at the opposite sides of the collector, and the edge parts of the collector were sandwiched by the supporting body and the gasket. Further, by coating the circumferences of the gasket and the supporting body with an epoxy resin, the electrolyte was sealed. Consequently, a terminal plate made of stainless for taking out a terminal was attached to the collector from the opposite sides by pressure. Thus, the electric double-layer capacitor using the polarizing electrode according to the present invention was manufactured.

After charging the electric double-layer capacitor according to the present invention using the single-layer carbon nanohorn aggregate and the electric double-layer capacitor according to the present invention using the phenol active carbon powder at a low voltage of 0.9 V for one hour, respectively, a constant current discharge was carried out with respect to them to 0.45 V Measuring the discharge electric charge amounts of respective electric double-layer capacitors when a discharge current value is 0.1 A and when it is 10 A, capacities thereof were obtained. Then, defining a value obtained by deducting the capacity when the discharge current value is 10 A from the capacity when it is 0.1 A as dC, a capacity change ratio $dC/C_{0.1A}$ of each electric double-layer capacitor was obtained.

As a result, although the capacity change ratio of the electric double-layer capacitor using the phenol active carbon powder is −15%, the capacity change ratio of the electric double-layer capacitor according to the present invention using the single-layer carbon nanohorn aggregate was −5%, and it was confirmed that a capacity lowering phenomenon upon discharging a large current was improved considerably. It is considered that this is attributable to the fact that the size distribution of the fine pore of the polarizing electrode using the single layer carbon nanohorn aggregate is favorable so that the mobility in the electrode was increased. Thus, according to the present embodiment, by composing the polarizing electrode by using the single-layer carbon nanohorn aggregate, a large current discharging characteristic of the electric double-layer capacitor could be improved. In addition, according to the present embodiment, the capacity of the electric double-layer capacitor could be increased.

EXAMPLE 2

At first, in the same way as the example 1, the single-layer carbon nanohorn aggregate was made according to the laser ablation method, and it was treated with the nitricacid solution. Then, by placing the single-layer carbon nanohorn aggregate treated with the nitricacid solution in a vacuum of $1\times10^{-3}$ Torr together with a carbon nanofiber, and providing a heat treatment to them, a front end of the single-layer carbon nanohorn aggregate was fused (supported) by the carbon nanofiber. The specific surface area of the material allowing this single-layer carbon nanohorn aggregate supported by the carbon nanofiber was 1,350 $m^2/g$.

As same as the example 1, after mixing the above-described material with the phenol resin powder at a weight ratio of 7:3, further, the dry blending was carried out by the ball mill. Then, dividing the mixture powders into 10 g each, and molding them at 150° C., at a pressure of 100 $kg/cm^2$, for ten minutes, the single-layer carbon nanohorn aggregates/phenol resin composites of 70×50 $mm^2$ with a thickness of 3 mm were manufactured, locating these composites in an electric furnace, and a heat treatment of these was performed at 900° C. for two hours. A cubic capacity of a fine pore of the obtained single-layer carbon nanohorn aggregate/phenol resin composite was measured by the mercury injection method, a diameter distribution of the fine pore was acquired, and then, it was found that a peak of the distribution was in a range of 50 to 100 nm. By using this single-layer carbon nanohorn aggregate supported by the carbon nanofiber and the phenol resin composite as the polarizing electrode, an electric double-layer capacitor was manufactured in the same way as the example 1.

After charging this electric double-layer capacitor at a low voltage of 0.9 V for one hour, a constant current discharge was carried out to 0.45 V at 0.1 A and at 10 A, respectively to check a capacity change ratio. As a result, it was confirmed that the capacity change ration was improved to −5% as same as the example 1. In addition, as compared to the example 1, it was confirmed that the capacity was increased. Thus, according to the present example, by composing the polarizing electrode by using the single-layer carbon nano-horn aggregate, a large current discharging characteristic of the electric double-layer capacitor could be further improved.

EXAMPLE 3

In the same way as the example 1, the single-layer carbon nanohorn aggregate was made according to the laser ablation method, and it was treated with the nitricacid solution. Here, the specific surface area of the single-layer carbon nanohorn aggregate was 1,300 $m^2/g$.

In the next place, after mixing this single-layer carbon nanohorn aggregate with the phenol resin powder at a weight ratio of 7:3, further, the dry blending was carried out by the ball mill. In the meantime, as the phenol resin here, the mixture in which the heat infusible phenol resin (a bellpearl R-type, made by Kanebo Corporation) of a weight ratio of 15 to 60% was mixed with respect to the heat fusible and heat hardening phenol resin (used in the first or second example) was used.

In the next place, dividing the obtained mixture powders into 10 g each, and molding them at 150° C., at a pressure of 100 $kg/cm^2$, for ten minutes, single-layer carbon nanohorn aggregates/phenol resin composites of 70×50 $mm^2$ with a thickness of 3 mm were manufactured. Then, locating these composites in an electric furnace, and a heat treatment of these was performed at 900° C. for two hours. By using the single-layer carbon nanohorn aggregates/phenol resin composites which were manufactured in this way, as same as the case of the example 1, an electric double-layer capacitor was manufactured.

After charging this electric double-layer capacitor at a low voltage of 0.9 V for one hour, a constant current discharge was carried out to 0.45 V at 0.1 A and at 10 A, respectively to check a capacity change ratio. As a result, it was confirmed that the capacity change ration was improved to −4.5% as same as the example 1. Thus, according to the present example, by composing the polarizing electrode by using the single-layer carbon nanohorn aggregate, and the mixture of the fusible and heat hardening phenol resin and the heat infusible phenol resin, a large current discharging characteristic of the electric double-layer capacitor could be further improved.

Some specific embodiments are cited and explained according to the present invention as descried above, however, the present invention is not limited to the above-described respective embodiments and it is obvious that the present invention can be modified within a scope of a technical spirit of the present invention.

INDUSTRIAL APPLICABILITY

According to the present invention, by using a single-layer carbon nanohorn aggregate having a specific structure as a polarizing electrode of an electric double-layer capacitor, diffusion of ions is enhanced and it becomes possible to provide a polarizing electrode suitable for supplying a large current and an electric double-layer capacitor using it.

The invention claimed is:

1. A polarizing electrode composed of a carbon composite:
   wherein, as a carbon material of said carbon composite, a single-layer carbon nanohorn aggregate, which is made in such a manner that the single-layer carbon nanohorns are aggregated spherically, is used; and
   wherein said single-layer carbon nanohorn aggregate is supported by a carbon fiber or a carbon nanofiber.

2. The polarizing electrode according to claim 1,
wherein said single-layer carbon nanohorn is a single-layer graphite nanohorn.

3. The polarizing electrode according to claim 1,
wherein, by allowing a front end of said single-layer carbon nanohorn composing said single-layer carbon nanohorn aggregate to be fused to said carbon fiber or said carbon nanofiber, said single-layer carbon nanohorn aggregate is supported by said carbon fiber or said carbon nanofiber.

4. The polarizing electrode according to claim 1, wherein:
the carbon composite is obtained by mixing the single-layer carbon nanohorn aggregate with a heat fusible and heat hardening phenol resin; and
the mixture is heat treated in a no-oxidizing atmosphere.

5. The polarizing electrode according to claim 4, wherein:
a gap is formed between the single-layer carbon nanohorn aggregate and the phenol resin.

6. The polarizing electrode according to claim 1, wherein:
the carbon composite is obtained by mixing the single-layer carbon nanohorn aggregate with a heat fusible and heat hardening phenol resin and a heat infusible resin;
the mixture is molded so that the heat infusible phenol rein keeps a particle shape; and the mixture is molded and heat treated in a no-oxidizing atmosphere.

7. The polarizing electrode according to claim 6, wherein:
a gap is formed inside the molded body by carbonizing the heat infusible phenol resin due to the heat treatment.

8. The polarizing electrode according to claim 7, wherein:
the carbon composite is impregnated with an electrolyte to become the polarizing electrode.

9. An electric double-layer capacitor comprising:
a polarizing electrode;
wherein said electric double-layer capacitor comprises a polarizing electrode is composed of a carbon composite including a single-layer carbon nanohorn aggregate made in such a manner that the single-layer carbon nanohorns are aggregated spherically as a carbon material; and
wherein the single-layer carbon nanohorn aggregate is supported by one of a carbon fiber or a carbon nanofiber.

10. The electric double-layer capacitor according to claim 9, further comprising:
a further polarizing electrode;
an insulated separator having an ion permeability situated between the polarizing electrode and the further polarizing electrode;
a pair of conductive sheets, each sheet disposed at an end surface of each polarizing electrode so as to sandwich these from the opposite sides;
a gasket made in a frame shape arranged surrounding an outer circumference of the polarizing electrode, the further polarizing electrode, and the insulated separator so as to prevent contact between edge parts of the pair of conductive sheets;
an outer terminal attached to each conductive sheet by pressure;
a supporting body arranged at opposite sides of the pair of conductive sheets; and
an epoxy resin coating the outer circumferential surfaces of the gasket and the supporting body so as to fill the gap between the gasket and the supporting body in order to seal an electrolyte.

11. A polarizing electrode comprising:
a carbon composite including a single-layer carbon nanohorn aggregate, each nanohorn in said aggregate formed of a tube part and a conical part,
wherein the single-layer carbon nanohorn aggregate is aggregated spherically and each nanohorn in said aggregate has said tube part facing a center of the spherical aggregate and said conical part projecting from a surface of the spherical aggregate as a horn;
wherein the single-layer carbon nanohorn aggregate is supported by one of a carbon fiber or a carbon nanofiber.

* * * * *